US007698686B2

(12) United States Patent
Carroll et al.

(10) Patent No.: US 7,698,686 B2
(45) Date of Patent: Apr. 13, 2010

(54) METHOD AND APPARATUS FOR PERFORMANCE ANALYSIS ON A SOFTWARE PROGRAM

(75) Inventors: Steven M. Carroll, Sammamish, WA (US); Eric C. Lee, Seattle, WA (US); Simon Meacham, Farnham (GB)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 11/107,464

(22) Filed: Apr. 15, 2005

(65) Prior Publication Data

US 2006/0248401 A1 Nov. 2, 2006

(51) Int. Cl.
G06F 9/44 (2006.01)
G06F 3/048 (2006.01)
(52) U.S. Cl. ....................... 717/125; 715/772
(58) Field of Classification Search .................. 717/125
See application file for complete search history.

(56) References Cited

U.S. PATENT DOCUMENTS

| | | | | |
|---|---|---|---|---|
| 5,862,381 | A * | 1/1999 | Advani et al. | 717/125 |
| 5,960,199 | A * | 9/1999 | Brodsky et al. | 717/128 |
| 6,226,787 | B1 * | 5/2001 | Serra et al. | 717/125 |
| 6,275,956 | B1 * | 8/2001 | On et al. | 717/125 |
| 6,611,276 | B1 * | 8/2003 | Muratori et al. | 715/772 |
| 6,701,363 | B1 * | 3/2004 | Chiu et al. | 709/224 |
| 6,789,182 | B1 * | 9/2004 | Brothers et al. | 712/30 |
| 7,131,113 | B2 * | 10/2006 | Chang et al. | 717/128 |
| 2002/0065948 | A1 * | 5/2002 | Morris et al. | 709/318 |
| 2003/0001854 | A1 * | 1/2003 | Jade et al. | 345/581 |
| 2003/0159133 | A1 * | 8/2003 | Ferri et al. | 717/130 |
| 2004/0117768 | A1 * | 6/2004 | Chang et al. | 717/125 |
| 2005/0108689 | A1 * | 5/2005 | Hooper et al. | 717/135 |
| 2007/0022407 | A1 * | 1/2007 | Givoni et al. | 717/124 |

OTHER PUBLICATIONS

Kranzlmüller, D., Grabner, S., and Volkert, J. 1996. Event graph visualization for debugging large applications. In Proceedings of the SIGMETRICS Symposium on Parallel and Distributed Tools (Philadelphia, Pennsylvania, United States, May 22-23, 1996). SPDT '96. ACM Press, New York, NY, 108-117. DOI=http://doi.acm.org/10.1145/238020.238054.*

Wu, P. and Narayan, P. 1998. Multithreaded performance analysis with Sun WorkShop thread event analyzer. In Proceedings of the SIGMETRICS Symposium on Parallel and Distributed Tools (Welches, Oregon, United States, Aug. 3-4, 1998). SPDT '98. ACM Press, NewYork, NY, 161. DOI=http://doi.acm.org/10.1145/281035.281063.*

(Continued)

*Primary Examiner*—James Rutten
(74) *Attorney, Agent, or Firm*—Wolf, Greenfield & Sacks, P.C.

(57) ABSTRACT

A system for displaying performance test information for software. The system includes a graphical user interface that displays information in a format to allow ready identification of performance problems and their causes. The interface includes a timeline view depicting activity levels during the execution of a program under test. Events during a sub-range of times during the program execution may be displayed with information revealing interactions of threads making up the program. Additional information may be displayed in a further display fields, including textual information. Much of the displayed information is represented graphically, allowing a performance engineer to quickly identify areas of the program to investigate further.

17 Claims, 5 Drawing Sheets

OTHER PUBLICATIONS

Taylor, D. J. and Coffin, M. H. 1994. Integrating real-time and partial-order information in event-data displays. In Proceedings of the 1994 Conference of the Centre for Advanced Studies on Collaborative Research (Toronto, Ontario, Canada, Oct. 31-Nov. 3, 1994), 9 pages.*

Carr, S., Mayo, J., and Shene, C. 2003. ThreadMentor: a pedagogical tool for multithreaded programming. J. Educ. Resour. Comput. 3, 1 (Mar. 2003), 1. DOI=http://doi.acm.org/10.1145/958795.958796.*

From Trace Generation to Visualization: A Performance Framework for Distributed Parallel Systems Wu, C.E.; Bolmarcich, A.; Snir, M.; Wootton, D.; Parpia, F.; Chan, A.; Lusk, E.; Gropp, W. Supercomputing, ACM/IEEE 2000 Conference, vol. Iss., Nov. 4-10, 2000, 18 pages.*

Jacobs et al., "OS/2 Database Manager Database Event Monitor" Sep. 1991, IBM Technical Disclosure Bulletin, vol. 34, No. 4A, pp. 150-151.*

International Search Report from International Application PCT/US2006/12176.

* cited by examiner

METHOD AND APPARATUS FOR PERFORMANCE ANALYSIS ON A SOFTWARE PROGRAM

BACKGROUND OF INVENTION

1. Field of Invention

This invention relates generally to software program development and more specifically to performance analysis of software programs.

2. Discussion of Related Art

Software programs are generally tested during their development. Testing has traditionally been used to verify that the software program performs the functions as intended. As software programs have become more complex, performance testing has become a more significant component of the development cycle. Performance testing supports "performance engineering" activities during which portions of the program that cause delay in program execution are identified and are rewritten to reduce the time required to execute the program.

Performance testing is often performed by inserting "probes" into a program under test. Probes are simple functions that write data into log files when executed. The data in the log files may then be analyzed to determine the various characteristic of the program operation.

Traditional performance analysis tools use data in the log files to present an aggregated view of execution of the software program under test. For example, the data in the log files may be used to determine the number of times each function in the software program under test has been invoked. Such information may, for example, reveal to a performance engineer that a particular function is in a loop that is executed more times than intended. Such an observation may for example, indicate that performance of the program may be improved by restructuring the program to reduce the number of times that loop is executed.

An aggregated view of the data may also indicate the average amount of time in which each function executes. If the average execution time for a function greatly exceeds the expected execution time, a performance engineer may investigate whether some event blocks execution of that function.

Tools have been employed that present performance data on a software program under test for a performance engineer to review. Such tools have, for example, allowed a performance engineer to select from multiple types of aggregated data so that the performance engineer could examine different aspects of a software program under test. Such tools have also included timeline views, which allow the performance engineer to see the activity level of the software program under test.

SUMMARY OF INVENTION

The invention relates to a user interface for providing performance data on a software program under test. The user interface allows a performance engineer, or other user, to manipulate the presentation of performance data to more readily identify portions of a software program under test that may be causing performance problems.

In one aspect, the invention relates to a method of displaying performance information concerning a software program under test. The method involves displaying in a first display area a representation of a time range during which the software program under test executes. A user input indicating an indicated portion of the time range displayed in the first display area is received through the user interface device. A plurality of graphical indicators are displayed in a second display area. Each graphical indicator represents events in the execution of one of the plurality of threads during a sub-range of the time range. The sub-range includes the indicated portion of the time range represented in the first display area.

In another aspect, the invention relates to a display device having rendered thereon performance information for a plurality of threads in a software program under test. The performance information comprises, for each of the plurality of threads, a thread area representing operation of the thread. The thread area has at least one indicator, each indicator representing an operating event of the thread, with the thread areas for the plurality of threads positioned so that indicators in the thread areas for the plurality of threads graphically illustrate correlation in time of operating events in the plurality of threads.

In another aspect, the invention relates to a computer-readable medium having computer-executable components for analyzing the performance of a software program under test, the software program under test adapted to execute in a plurality of threads. The computer-executable components comprising a data collection component, adapted to collect data on the execution of the plurality of threads in the software program under test; an analysis component, adapted to analyze the collected data to derive execution information about the plurality of threads; and a reporting component, adapted to display in human perceptible form the execution information on at least a portion of the plurality of threads, the human perceptible form including a graphical representation of execution information as a function of time for each the plurality of threads in the portion, with the graphical representations of each of the plurality of threads in the portion displayed in a format that allows correlation of time of events in each of the plurality of threads in the portion.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

An improved performance analysis tool is provided that may be used for performance analysis. The tool presents performance analysis information in multiple formats and allows display areas presenting data in different formats to be configured. Configurability allows a user, such as a performance engineer, to identify points in a program under test at which performance problems occur and also to "drill down" to identify the causes of performance problems.

Figure 1:
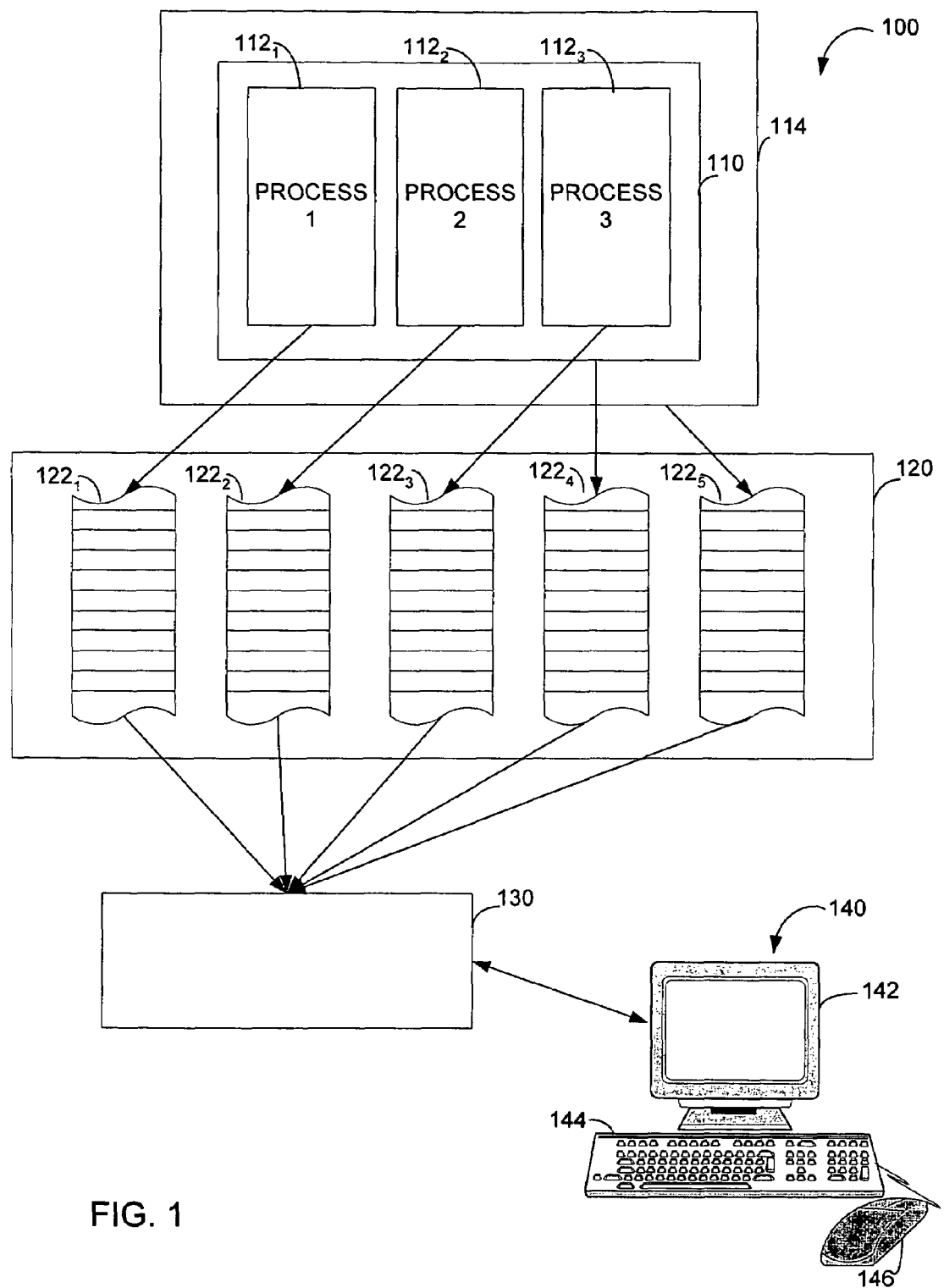
FIG. 1 is sketch illustrating a development environment.

FIG. 1 illustrates in block diagram form a development environment 100 in which such a tool may be used. Development environment 100 may, for example, be created in a computer work station or on a server, or on a group of networked computers or on any other suitable platform capable of executing programs.

Program under test 110 is here shown to be made up of multiple processes. In the example of FIG. 1, processes $112_1$, $112_2$, and $112_3$ are shown. The number of processes in program under test 110 is not a limitation of the invention. However the invention may be most useful in analyzing the performance of programs under test containing numerous processes.

Each process may execute a "thread." A thread is a portion of a program which, in most cases, executes in a process. A process and a thread are therefore closely related concepts. Each thread has its own sequence of function calls and other program events.

Separate processes may be executed on separate processors. However, separate processes may be created on a single processor. The processor resources are shared between processes, with all the threads active at any given time taking turns consuming processor cycles. Multiple threads can be "virtually" active on a single processor even though one process is consuming processor cycles at a time.

In contrast, a thread may become "blocked" regardless of the number of processors available. Multiprocess systems include a mechanism for threads executing in separate processes to exchange data. If a thread needs to exchange data with another thread, the two threads may not be ready to exchange data at the same time. Accordingly, one thread may need to wait until the other thread executes to the point of being read to exchange data. While a thread is waiting for another thread to exchange data or perform some other function, the thread is said to be "blocked." "Blocking" of threads in an important event that can impact the performance of a program.

In the example illustrated in FIG. 1, each of the processes $112_1$, $112_2$, and $112_3$ is instrumented with probe functions, such as may be found in the prior art. As program under test 110 executes, the probe functions write data into data file 120. In this embodiment, data file 120 is organized as multiple buffers $122_1, 122_2, \ldots 122_5$. In this embodiment, one buffer is provided for each of the processes in program under test 110.

As program under test 110 executes, the probes embedded within each of the processes $112_1$, $112_2$, and $112_3$ are executed. The probes in the separate processes write data values into a buffer associated with the process. In this way, each of the buffers $122_1$, $122_2$, and $122_3$ contains an ordered list of events that occurred within the process as it executed. Because of the connection between threads and processes, this information may also be used to identify the thread with which events are associated. In the illustrated embodiment, each event written into a buffer includes an indication of the event as well as the time at which it occurred.

In the illustrated embodiment, the program under test 110 is constructed such that calls through predetermined application programming interfaces (API) cause events to be recorded in a buffer. In the illustrated example a call through a predetermined API is recorded in buffer $122_4$. Buffer $122_4$ stores information identifying the portion of the API called, the process from which the call was made and the time at which the call was made.

Program under test 110 is executing on a platform that includes an operating system 114. In this embodiment, operating system 114 is also configured to write various events to data file 120. Predetermined events, such as an exception condition or disk access, may be programmed within operating system 114 to write an indication of an event into data file 120. When such an event occurs, the indication is written into the buffer $122_5$. The indication of the event may include an identifier of the specific event that occurred, the time it occurred and the process of thread that caused the event to occur.

FIG. 1 provides an example of the types of events that may be captured during execution of the software program under test. According to an embodiment of the invention, many types of events may be displayed for a human user in an easy to use manner. For example, SQL events, OS kernel events, web server events or any other desired type of event may be captured in data file 120 for further analysis and display.

In the illustrated embodiment, the data stored in data file 120 is analyzed after program 110 executes. The analysis is performed by an analysis program 130. In the described embodiment, analysis program 130 correlates the times of events stored in each of the buffers $122_1, \ldots 122_5$. Various methods are possible for correlating the time of events in each of the buffers. In the described embodiment, an index is created. The index indicates which entry in each buffer corresponds to a specific time during execution of the program under test 110. In this way, as the analyzed data is processed, analysis program 130 may quickly access the data from each of the buffers corresponding to a specific point in time during execution of program under test 110. The index may be created adaptively such that the index may represent estimates of the locations in each buffer corresponding to events occurring at a specific time. As the data file 120 is processed, these estimates may be updated. However, any suitable manner of forming an index may be used.

Indexing the data stored in data file 120 allows analysis program 130 to rapidly format data for display on a user interface 140 in a fashion that shows events within different processes relative to a common time frame. For correlating events in different processes or threads, time need not be tracked relative to an absolute standard. Rather, time may be tracked relative to the beginning of execution of the program under test 110 or any another convenient point. Time may, for example, be tracked in terms of ticks of a clock internal to the processor on which program under test 110 executes.

In the illustrated embodiment, user interface 140 is a portion of a computer work station. However, any suitable user interface device may be employed. In this example, user interface 140 includes a display 142 that provides an output mechanism. Display 142 may, for example, be a CRT or TFT display that allows output to be provided to a human user. Other forms of output devices may be used. For example, graphical output may be printed or projected onto a screen. Alternatively, the output may be passed to other programs or systems for further analysis before use to provide information to a user.

User interface 140 also includes a user interface selection device. The user interface selection device allows a user to provide input through user interface 140 that may control the operation of analysis program 130. In the pictured embodiment, user interface 140 includes a mouse 146 that may be used to supply user input through user interface 140. As with a traditional desktop computer, the human user may manipulate the mouse to position a cursor on display 142 and operate buttons on mouse 146 (i.e., "click") to select as input items on the display 142. User interface 140 may invoke a program object based on the position at the time a button is pressed.

Keyboard 144 may also act, alone or in conjunction with mouse 146, as a user interface selection device. A human user may use keyboard 144 to enter commands, parameters or other information appropriate to provide input through user interface 140. In the described embodiment, the user input controls analysis program 130 to provide a desirable display on display 142.

Figure 2:
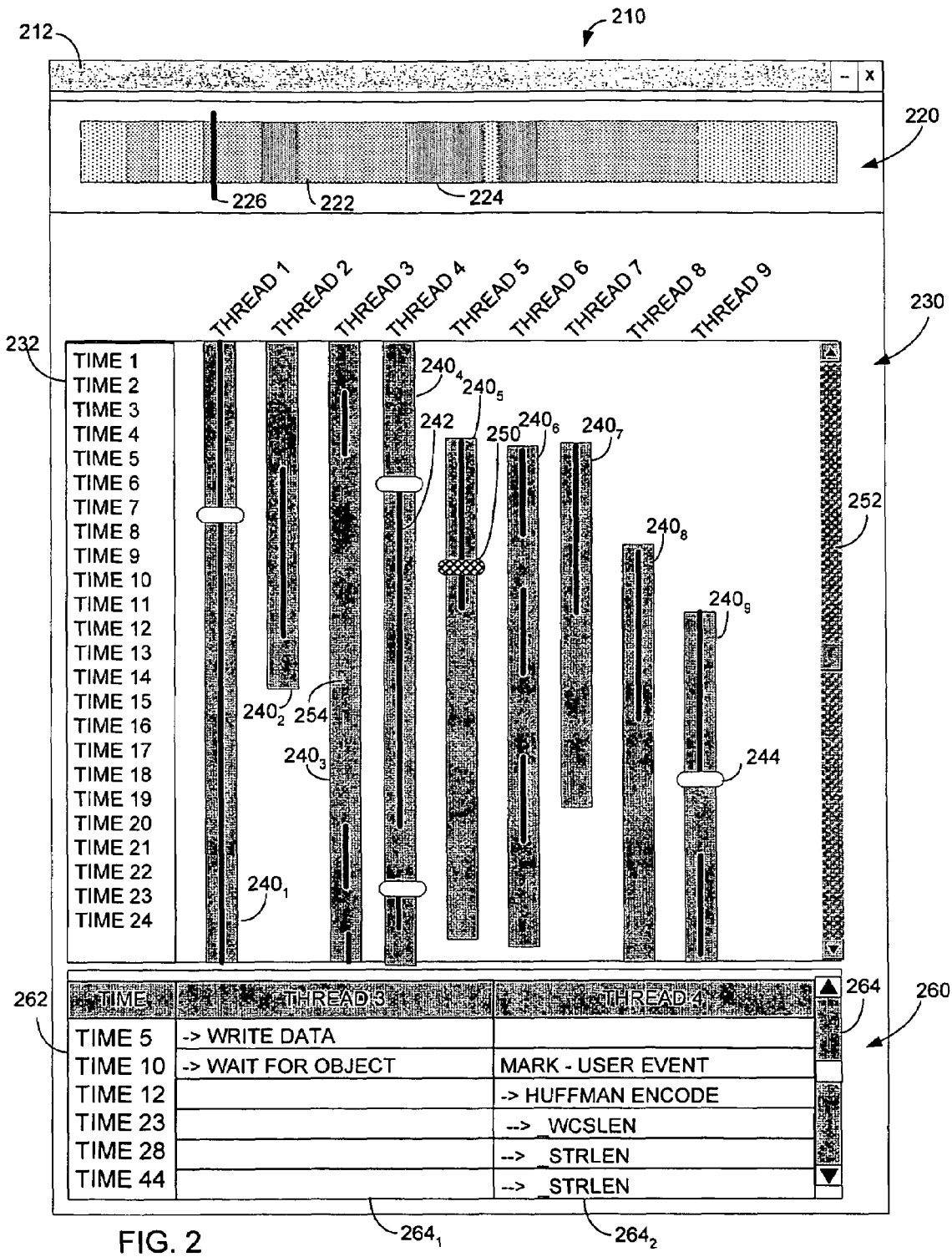
FIG. 2 is a sketch of a user interface in development environment of FIG. 1.

FIG. 2 shows a sample user interface 210 that may be created by analysis program 130 and appear on display 142 to present the data gathered during execution of a software program under test to a human user. In the embodiment of FIG. 2, user interface 210 contains multiple regions. In the described embodiment, the regions are used to group logically related information. For example, menu bar 212 serves as a region for locating commands that a user may access to control the information or functionality of user interface 210. Commands included in the menu bar 210 may be commands as used in traditional graphical user interfaces, such as those opening or closing a specific file. Commands may also control the information displayed in the rest of user interface 210 or may control operations specific to a user interface used to display performance data gathered from execution of a software program under test.

In the embodiment pictured in FIG. 2, user interface 210 contains three regions in which different, through logically related, types of information about the execution of software program under test 110 are displayed. These regions include timeline field 220, threadview field 230 and textview field 260.

Timeline field 220 includes a graphical representation of the level of activity during execution of software program under test 110. In this embodiment, the level of activity is illustrated by shading within timeline field 220. For example, region 222 has less shading than region 224. This shading illustrates that less activity occurred during the time represented by region 222 as compared to region 224, indicating less activity during the time represented by region 222.

In this example, the entire execution of software program under test 110 is represented by a timeline moving from left to right. Any suitable form of representation of activity may be used. For example, different colors may be used to signify different levels of activity. Alternatively, the timeline represented by timeline field 220 may be presented as a histogram, with the height of the display of the timeline indicating the level of activity at any particular time during execution of software program under test 110.

The level of activity may be measured in any suitable way. Process monitors that track a percentage of CPU time consumed by an executing program are known in the art and may, for example, be employed to create the data to generate a timeline field such as 220 indicating level of activity. In this embodiment, timeline field 220 represents the aggregate activity of all of the processes $112_1$, $112_2$, and $112_3$ executing portions of software program under test 110. It does not, in this example, include information about activity in processes executing programs that are part of the operating system 114.

Timeline field 220 includes a time indicator 226. Time indicator 226 is a user operable control. For example, time indicator 226 may be selected by a user operating mouse 146 (FIG. 1). The user may then manipulate mouse 146 to slide time indicator 226 to a desired point of interest on timeline field 220 using drag and drop actions as are commonly used in program interfaces. In this way, a user may specify a portion of the data stored in data file 120 (FIG. 1) for further examination. In particular, the data gathered for a sub-range of the execution time specified by time indicator 226 may be displayed in greater detail in the threadview field 230.

As illustrated, time indicator 226 specifies a single time. Various embodiments are possible by which a user may specify a range of times for display in threadview field 230. In this example, threadview field 230 contains information about the operation of software program under test 110 in a sub-range of times centered around the time indicated by time indicator 226. However, any suitable convention may be used. For example, timeline field 220 may include multiple indicators, one time indicator identifying the start of the interval to be displayed in threadview field 230 and a second time indicator identifying the ending time to be displayed in threadview field 230.

Regardless of the specific mechanism used to identify a sub-range of times to display in threadview field 230, threadview field 230 contains a graphical representation of events within threads executing as part of software program under test 110 during the selected interval. In the embodiment illustrated in FIG. 2, each thread is represented by an area, here shown as trace bars $240_1$, $240_2$ ... $240_9$. Here, nine threads are illustrated. The number of threads for which events are illustrated is not a limitation on the invention.

Events within each thread are illustrated graphically within the corresponding trace bar. Multiple types of events are illustrated. The number and types of events is for illustration only and any number or type of events may be displayed.

In the embodiment illustrated in FIG. 2, each of the trace bars $240_1$, $240_2$ ... $240_9$ indicates the time during which its corresponding thread exists. In operation of program under test 110, threads may begin and end at various times, which can be graphically represented in threadview field 230.

Additionally, even though a thread exists, it may be active only a portion of the time that it exists. Any suitable measure of a thread activity may be used. However, in the illustrated embodiments, a thread is considered "active" when it has operations to execute, even if not actively consuming CPU cycles because of scheduling of multiple processes in a system having a limited number of processors. In user interface 210, tracebars $240_1$, $240_2$ ... $240_9$ are made to visually indicate time periods during which the corresponding thread is active or blocked. Any suitable method may be used to identify active or blocked periods. In this example, an active indicator, such as active indicator 242, is superimposed on a tracebar to indicate times during which the corresponding thread is active. Conversely, the absence of an active indicator, such as in blocked interval 254, illustrates that the corresponding thread is blocked during a specific interval.

Other events may also be indicated graphically in threadview field 230. In this example, user marks such as 244 are illustrated. As described above in connection with FIG. 1, events within software program under test 110 may be recorded. In this example, each of the user marks 244 is a graphical indication that a call has been placed to a function within an API of software program under test 110. System mark 250 similarly indicates the occurrence of one of the events tracked by operating system 114. In this example, system mark 250 is visually distinguishable from user mark 244. Color, shape or positioning may be used to differentiate between types of marks. Multiple user marks are indicated in FIG. 2. The user marks are all indicated by the same graphical symbol, which may represent multiple occurrences of the same event. Different types of user marks may be represented by the same or different graphical symbols, Threadview field 230 includes a time scale 232. Events within each tracebar $240_1$, $240_2$ ... $240_9$ are correlated to the time scale 232. The events within the tracebars are therefore correlated with each other. By reading from side to side across threadview field 230, events occurring within the threads at one time may be compared. By reading down the threadview field 230, a sequence of events may be apparent.

Time scale 232 displays a sub-range of the times represented by timeline field 220. The specific sub-range displayed may be selected by a user manipulating time indicator 226. Additionally, threadview field 230 includes a scrollbar 252. The scrollbar provides an alternative mechanism to select a sub-range of times for display. Scrollbar 252 may be a control of the type now known or hereafter developed for use in graphical user interfaces. By using scrollbar 252, a user may translate the time sub-range displayed in threadview field 230 to an earlier time or a later time. In this embodiment, time indicator 226 and scrollbar 252 are correlated controls, meaning the adjustment of either time indicator 226 or scrollbar 252 adjust the center point of the sub-range of times displayed in threadview field 230.

Being able to display events within threads in a correlated fashion allows a human user to readily identify portions of program 110 that may cause performance problems when program under test 110 executes. For example, FIG. 2 indicates that THREAD 3 is active for a relatively short period of time and then becomes inactive. During the period of inactivity, THREAD 4 becomes active for a relatively long period of time. THREAD 4 then becomes inactive and THREAD 3 becomes active again. Such a pattern may, for example, indicate to a human user that THREAD 3 is blocked while waiting on THREAD 4. Such a pattern may indicate that overall performance of the program may be improved by investigating the time required for THREAD 4 to execute or whether THREAD 3 is, in fact, blocked waiting for THREAD 4. Such a scenario may not be apparent from viewing only aggregated statistics. Aggregated statistics may reveal that THREAD 3 had a long execution time, but may not reveal the cause.

FIG. 2 shows that user interface 210 includes a textview field 260 that allows additional information to be obtained about the execution of the various threads. In the illustrated embodiment, THREAD 3 and THREAD 4 have been highlighted in textview field 260. In the described embodiment, the user selects which fields to be displayed in textview field 260, but any suitable method may be used to select the threads to be displayed in textview field 260. For example, a user may use a button on mouse 146 to access a properties menu for one of the threads illustrated in threadview field 220 and select in that menu that the threads should be displayed in textview field 260. As another example, a user could use mouse 146 to drag and drop the trace bar representing the desired field within the textview field 260.

Each thread selected for display in textview field 260 is represented by an event trace such as $264_1$ or $264_2$. Each event trace includes a listing of events within the thread depicted by the event trace. In this example, the events listed in the event traces $264_1$ or $264_2$ represent calls to functions made from the thread and the mark events, such as a call to a specific API or access of an operating system utility, initiated by the thread. However, any desired type of event may be displayed. For example, SQL events, OS kernel events, web server events, etc. may be displayed instead of or in addition to the events depicted in FIG. 2.

Textview field 260 includes a timescale 262. Timescale 262 indicates that the event traces depicted in textview field 260 describe events within a sub-range of the time over which software program under test 110 execute. The sub-range of times depicted in textview field 260 may be the same as the sub-range depicted in threadview field 230. However, in the example of FIG. 2, textview field 260 includes a scrollbar 264 that may be manipulated by user input to adjust the center point of the sub-range depicted in textview field 260.

Timescale 262 is here shown to be discontinuous. In the illustrated embodiment, an entry is made in textview field 260 only when an event is available for display at that time. In this way, consecutive events are displayed adjacent to each other regardless of any gaps in time between when those events occurred.

In the example of FIG. 2, the threadview field 230 and textview field 260 are displayed simultaneously but are of different sizes. In this embodiment, the fields are implemented as display areas as used in a conventional user interface and may be resized in any suitable manner to increase or decrease the amount of data shown in each window. Also, the illustrated embodiment shows timeline field 220, textview field 260 and traceview field 230 simultaneously on the display. Each could be displayed at separate times or these fields may be displayed simultaneously in any desired combination.

Textview field 260 may facilitate analyzing the performance of software program under test 110. In the example pictured, the event trace $264_1$ for THREAD 3 confirms that at TIME 6, THREAD 3 is waiting for another thread. The additional detail available in textview field 260 shows that THREAD 3 is waiting following a WRITE data function executed at TIME 5. Event trace $264_2$ indicates that THREAD 4 is performing the various operations associated with writing data. Event trace $264_2$ indicates that starting at TIME 10, THREAD 4 spends a significant time executing the _STRLEN function. This information may allow a human user to quickly identify a performance problem with program under test 110.

By displaying both a thread view and an event trace of the program execution, a performance engineer may quickly identify the source of a problem. The graphical representation may be used to identify specific areas to investigate further and details of those specific area may be provided in textural form. Further, the ability to alter the sub-ranges of time values shown in each of the fields further contributes to the ease with which a performance engineer may identify problems. For example, THREADS 3 and 4 show a similar pattern at TIME 23, indicating that at TIME 23, THREAD 3 may also be making a call to a function performed by THREAD 4. However, in the instance illustrated at TIME 23, THREAD 4 is active for a much shorter time than in the instance illustrated at TIME 5. This pattern of performance data may indicate that sometimes when THREAD 3 calls a WRITE data function, the operation takes much longer than other times. Such a performance pattern makes it difficult to identify from aggregated data which function is the source of a particular performance problem. However, by allowing a user to examine events in different threads correlated in time over a selectable sub-range, performance problems may be more readily identified.

Figure 3:
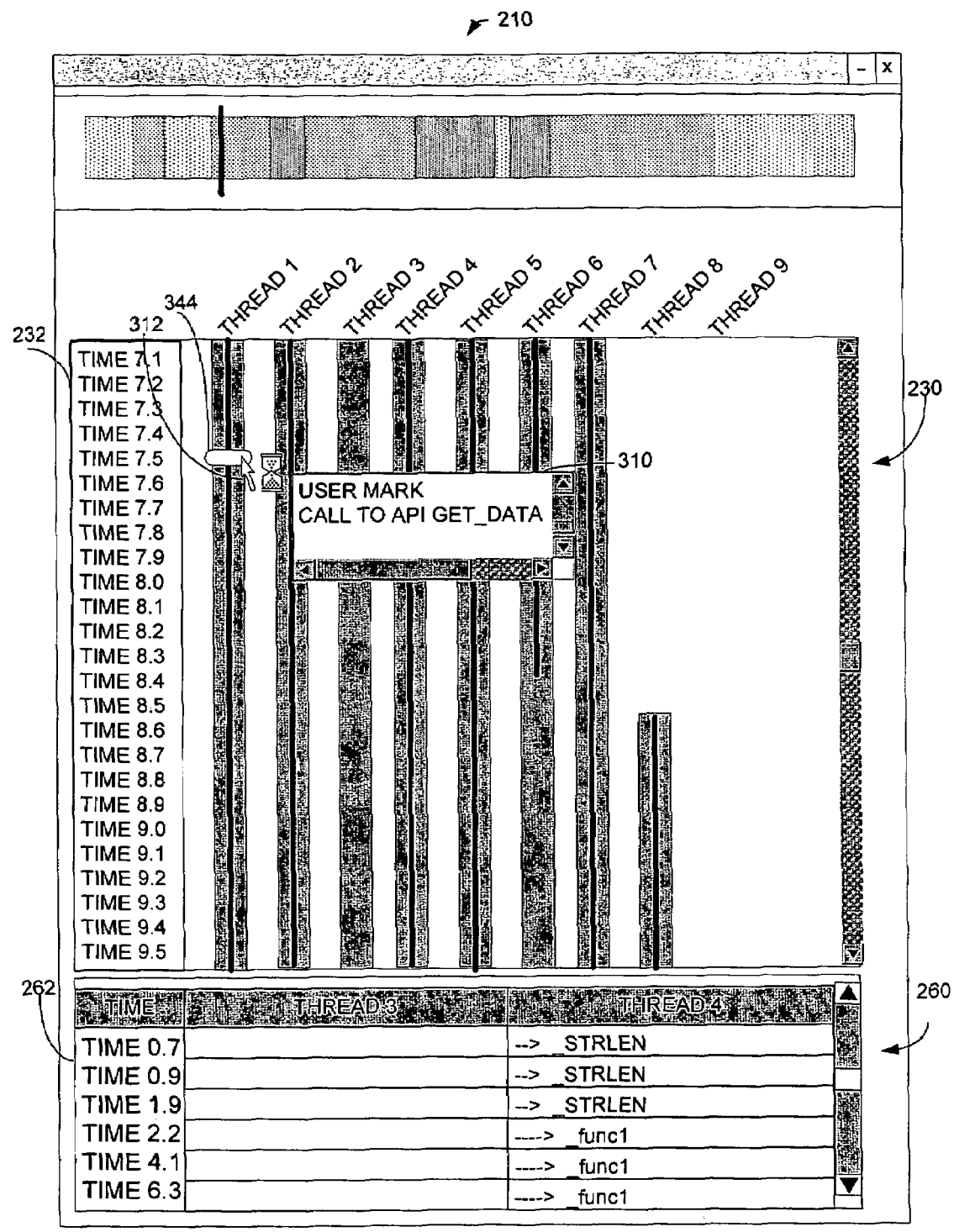
FIG. 3 is a is a sketch of the user interface of FIG. 2 in an alternative operating state.

FIG. 3 shows a further feature of user interface 210. In the example illustrated in FIG. 3, timescale 232 for threadview field 230 has been expanded. In this illustration, the window in which threadview field 230 is displayed is the same size as in FIG. 2, but the sub-range covered by timescale 232 is approximately $\frac{1}{10}^{th}$ of that shown in connection with FIG. 2. As a result, the events within the threads displayed in threadview field 230 are displayed with a higher resolution. The resolution of timescale 232 may, for example, be adjusted based on user input. A user may, for example, use mouse 146 (FIG. 1) to position a cursor over timescale 232 and right click on that field to open a properties dialogue box or other control that allows the user to input information specifying the desired resolution of the timescale 232. However, any suitable method of providing input may be used to specify the time scale.

FIG. 3 shows that timescale 262 associated with textview field 260 also has a programmable resolution. In the example of FIG. 3, the resolution of timescale 262 matches the resolution of timescale 232. However, any suitable means may be used to set the resolution of timescale 262 and the resolution timescale 262 need not match the resolution of the timescale 232.

FIG. 3 shows an advantage that may be achieved by changing the resolution of a timescale such as 232 or 262. At the resolution pictured in FIG. 2, THREAD 4 appears to spend a long period of time in the function _STRLEN. With the resolution shown in FIG. 3, it can be seen that a portion of the time that THREAD 4 spends within a function _STRLEN is spent in calls to other functions such as _func1.

FIG. 3 also illustrates a further aspect of user interface 210. By manipulating mouse 146 (FIG. 1) a cursor 312 may be positioned above any of the graphical representations of an event. Additional information about each of the events depicted graphically in user interface 210 may be obtained. In the example of FIG. 3, a user is positioning cursor 312 above a mark 344. The user may provide input, such as right-clicking on mark 344 or by simple "hovering" the cursor above mark 344. In response to this user input, analysis program 130 may provide additional information on the mark in a textbox 310. The information appearing in the textbox 310 may depend on the specific event represented by the graphical object selected by the user and may provide information about any desired event on the display, including SQL events, OS kernel events or web server events.

Figure 4:
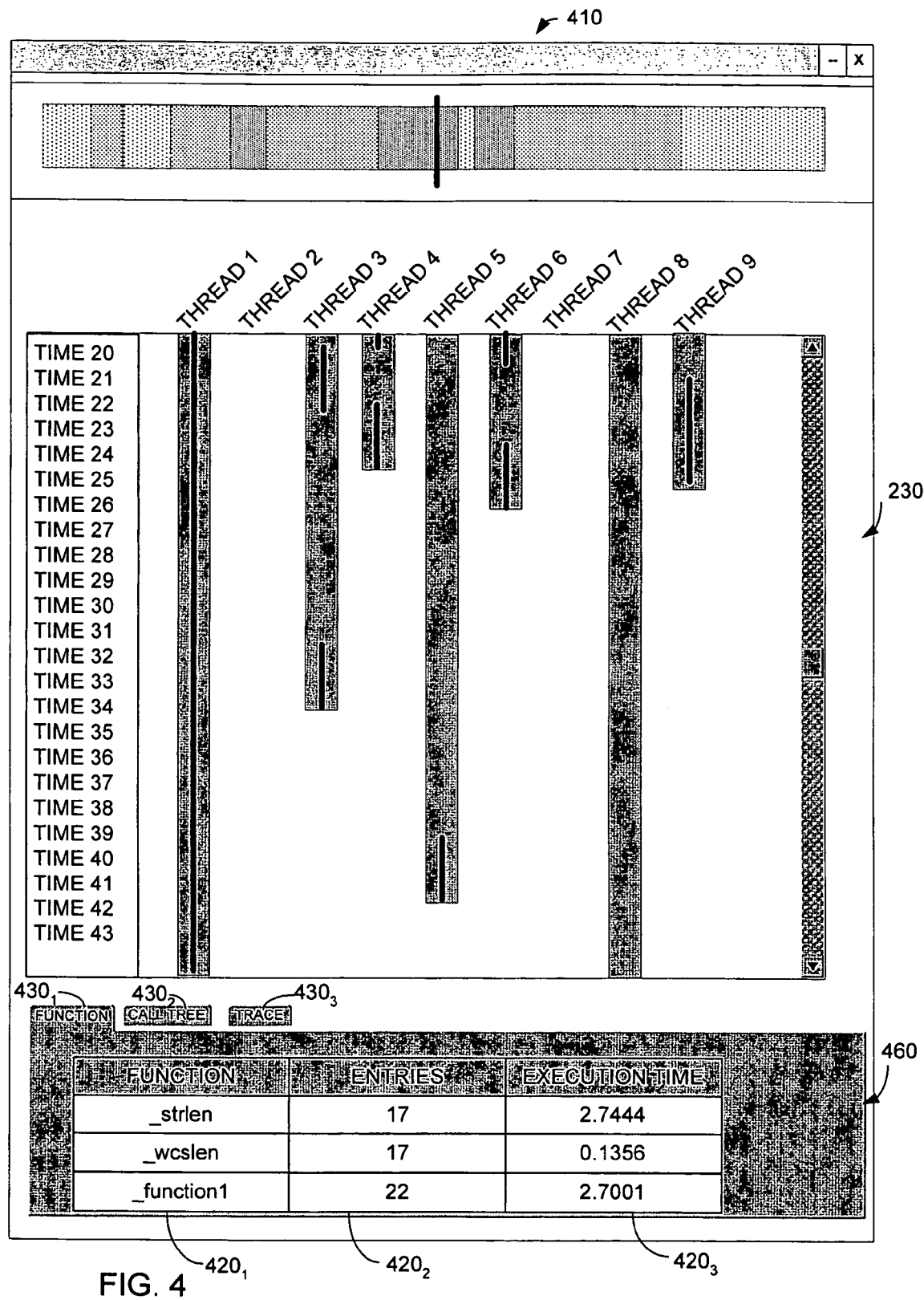
FIG. 4 is an alternative embodiment of a user interface in the development environment of FIG. 1.

FIG. 4 shows a user interface 410 according to an alternative embodiment of the invention. In this embodiment, textview field 460 is provided with multiple tabs such as $430_1$, $430_2$ and $430_3$. Each of the tabs may be selected through the user interface by manipulating mouse 146 to position the cursor above the tab and clicking on it. Each of the tabs, when selected, may display a different kind of information within textview field 460. Tab $430_1$ presents aggregate information about the functions such as was sometimes presented by performance analysis systems in the prior art. When selected, tab $430_1$ displays a column $420_1$ listing functions called during the execution of software program under test 110. Adjacent columns provide information about each of the functions listed in column $420_1$. For example, column $420_2$ indicates the number of entries into that function recorded during execution of software program under test 110. Column $420_3$ indicates the aggregate execution time within the function. The information presented in this tab is aggregated or statistical information, it does not show events with chronological references.

Tab $430_2$, when selected, may display a call tree similar to call trees displayed in prior art performance analysis systems. Any other type of data that may be generated by a performance analysis systems, whether now know or hereafter developed, may be selectively displayed for a human user by providing a tab that may be selected to access the data. Tab $430_3$ may be activated to provide an event trace such as is depicted in FIG. 3.

FIG. 4 shows an additional aspect of user interface 410. In this example, threadview field 230 is showing a sub-range of times that is after the sub-range of times depicted in FIG. 2. Accordingly, time indicator 226 appears further to the right in timeline field 220 than in FIG. 2.

Figure 5:
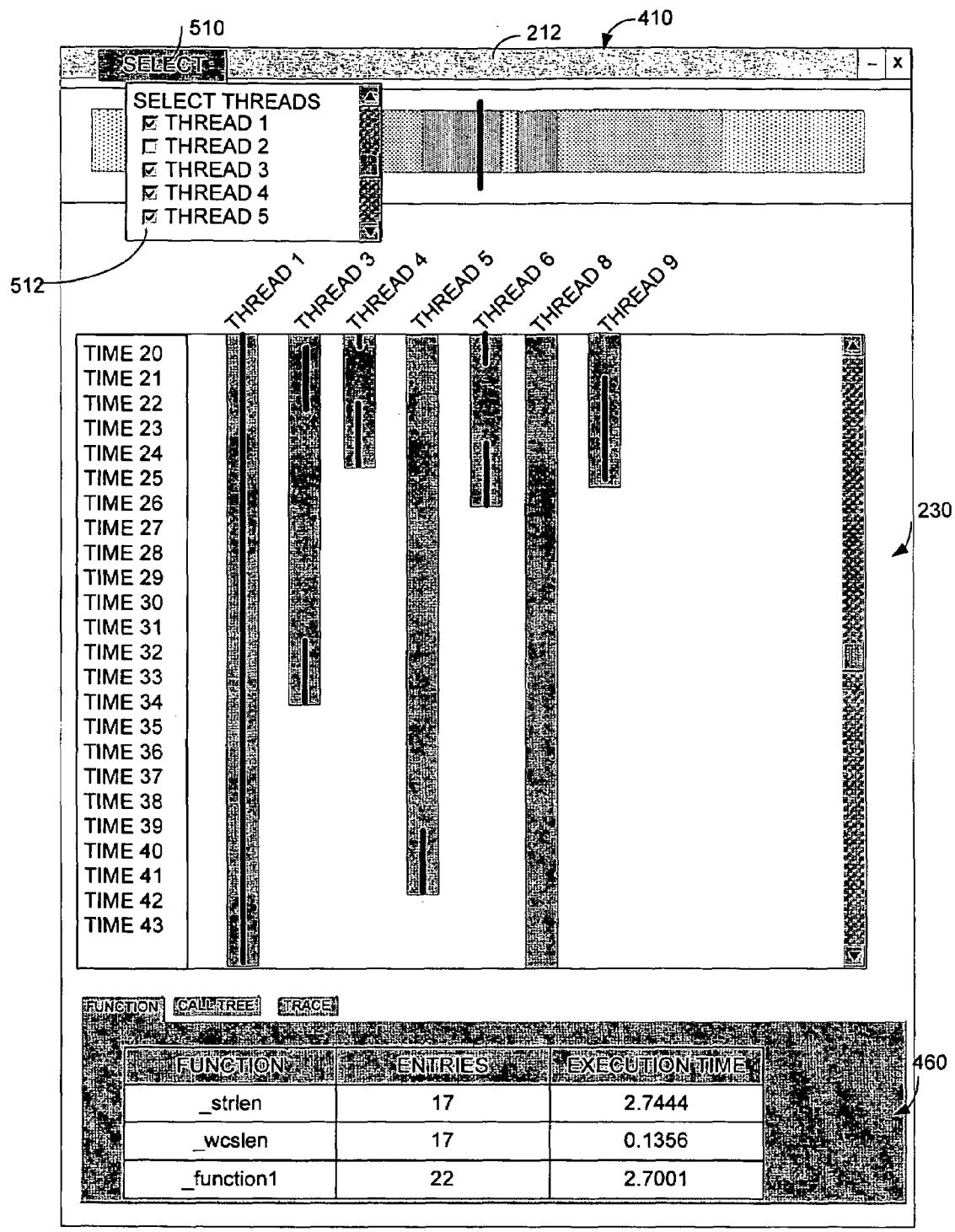
FIG. 5 is a sketch of the user interface of FIG. 4 in an alternative operating state.

FIG. 5 shows a further aspect of user interface 410. The threads represented in thread view field 230 may be selected based on user inputs. Allowing a user to select threads facilitates the process of identifying performance problems by allowing the user to juxtapose graphical representations of events in different traces. In this way, the user may identify dependencies between threads and identify performance problems caused by these dependencies.

FIG. 5 gives an example of one mechanism that could be used to allow a user to select threads for display. In this example, user interface 410 includes a SELECT area 510 on menu bar 212. SELECT area 510 may be implemented as menu item as is traditionally used in graphical user interfaces, which, when selected, opens a list box 512.

List box 512 includes a list of the threads in program under test 110, each with a check box next to it. Each check box is in turn a control that, when selected, causes the corresponding thread to be included in the list of threads displayed in thread view window 230.

Other aspects of selection of threads may also be available through controls in user interface 410. For example, controls may allow a user to specify the ordering of threads in thread view window 230.

The above described features allow the user the ability to organize performance data on a program under test in a way that facilitates ready understanding of the dynamic interactions of a multi-threaded program. It provides multiple levels of drill down, which allows a performance engineer or other user to do performance engineering on programs with an effective process. In a typical scenario, the process may include using timeline field 220 to identify sub-regions during the execution of the program worthy of further investigation. For example, sub-regions in which intense activity or very little activity occurs may be identified and further investigated.

Once a sub-region for further study is selected, specific threads in that sub region may be examined. The user may adjust the time scale for the display in thread view field 230 to better identify points with a single thread or a point at which combinations of interactions between threads slowed execution of the program. Visual indicators, such as markers and activity bars, in thread view field 230 may guide the user in identifying problem areas.

The user may then obtain more detailed information about the specific interactions of certain threads by selecting those threads for display in the text view window 460. Events may be presented in a chronological format or aggregated data for functions or other program elements may be presented.

The display areas, as is traditional in many graphical user interfaces, may be opened, closed, minimized or repositioned on the display screen so that a user may customize the appearance of the display.

The controls in the user interface may be implemented in any suitable way, whether now known or hereafter developed. For example, software development environments often have extensible interfaces that allow menu items to be incorporated in graphical user interfaces to programs. Further, such development environments also allow predefined controls, with actions customized for the application, to be incorporated into a graphical user interface. Controls such as scroll bars, text boxes, and drop down lists are examples of currently known controls used in graphical user interfaces and may, for example, be implemented as Active-X objects.

In operation, the information displayed on the graphical user interface may be generated in any suitable way. As described above, information on events is collected in buffers. The buffers are indexed to allow for ready processing of the information. Analysis program 130 may compute aggregated data as is known in the art. Analysis program 130 may also use the time ordered information in the buffers to identify events that signal the beginnings and ends of Analysis program may be a program prepared in any suitable programming language, such as C++. It may be stored in computer-readable media associated with any suitable processor, such as the processor associated with a work station used by a performance engineer.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. In a computer system having a graphical user interface including a display and a user interface device, a method of displaying performance information concerning a software program under test, the software program under test executes with a cumulative activity level, and the software program under test adapted to execute in a plurality of threads, each adapted to execute, the method comprising the steps of:
    displaying in a first display area a representation of a time range during which the software program under test executes including a graphical representation of the cumulative activity level of the execution of the software program under test during the time range, further including a graphical time position indicator indicating an indicated portion of the time range;
    displaying in a second display area a plurality of graphical indicators, each graphical indicator representing events in the execution of one of the plurality of threads during a sub-range of the time range, the sub-range being strictly smaller than the time range and including the indicated portion of the time range represented in the first display area;
    receiving through the user interface device a user input to move the graphical time position indicator in the first display area to a different portion of the time range;
    in response to the user input, modifying the plurality of graphical indicators in the second display to represent events in the execution of the plurality of threads during a different sub-range of the time range, the different sub-range including the different portion of the time range represented in the first display area; and
    displaying in a third display area textual information regarding events in the execution of one of the plurality of threads represented by a graphical indicator in the second display area, the textual information comprising descriptions of calls to functions made within the thread,
    wherein the graphical representation of the first display area provides a quantitative indication of the cumulative level of activity of the plurality of threads.

2. The method of claim 1, wherein:
    the user interface device comprises a pointing device and receiving a user input to move the graphical time position indicator in the first display area to a different portion of the time range comprises sensing that the user has used the pointing device to drag the graphical time position indicator and dropped it on a different location of the graphical representation of the time range.

3. The method of claim 1, additionally comprising receiving a user input indicating a time scale for the second display area and adjusting the sub-range in response to the user input indicating the time scale.

4. The method of claim 3, wherein the second display area additionally comprises a scroll bar and the method additionally comprises receiving a user input thorough the user interface device to move the scroll bar and adjusting the sub-range displayed in the second display area in response to the user input to move the scroll bar.

5. The method of claim 1, wherein the software program under test comprises functions that are executed as the software program under test executes and displaying in a third display area additionally comprises:
    a) receiving user input specifying the nature of the textual information to be displayed in the third display area; and b) displaying selectively in response to the user input specifying the nature of the textual information aggregated information characterizing the execution of functions within the software program under test.

6. The method of claim 1, wherein:
a) the software program under test comprises an application program executing on a platform comprising an operating system; and
b) displaying a plurality of graphical indicators representing events comprises indicating execution of function calls to either predetermined portions of the operating system or predetermined portions of the software program under test.

7. A display device having rendered thereon performance information for a plurality of threads that operate during execution of a software program under test such that operating events occur at times during execution of the software program under test, the performance information comprising:

for each of the plurality of threads, a thread area representing operation of the thread during a time interval, the thread area having at least one indicator, each indicator representing an operating event of the thread, with the thread area for each of the plurality of threads positioned so that indicators in the thread areas for the plurality of threads graphically illustrate correlation in time of operating events in the plurality of threads;

a text display area comprising a plurality of textual representations, each textual representation including an indication of events in the execution of one of the plurality of threads represented by a graphical indicator in the thread area, the events comprising calls to functions made within the thread;

a first user input mechanism adapted to receive a user indication of the nature of the textual information to be displayed in the text display area;

a second user input mechanism adapted to receive user input specifying selected threads of the plurality of threads, wherein the text display area is adapted to separately display a textual representation of each of the selected threads;

a timeline area representing a time range during which the software program under test executes and indicating graphically a cumulative activity level of the execution of the software program under test, the time range being strictly larger than the time interval, the graphical representation providing a quantitative indication of the cumulative level of activity of the plurality of threads, the timeline area further comprising a graphical time position indicator indicating graphically the time interval within the time range; and a third user input mechanism adapted to receive user input to move the graphical time position indicator in the time line area to a different time interval within the time range, wherein, in response to the user input to move the graphical time position indicator, the thread area corresponding to each of the plurality of threads is modified to represent operation of the thread during the different time interval.

8. The display device of claim 7, wherein each of the thread areas comprises a region having more length than width on the display screen and within at least a portion of the plurality of thread areas an indicator represents a second time range when the thread represented by the thread area is blocked waiting for another thread.

9. The display device of claim 7, wherein each of the thread areas comprises a region having more length than width on the display screen and within at least a portion of the plurality of thread areas an indicator represents a second time range when the thread represented by the thread area is active.

10. The display device of claim 8, wherein at least one of the thread areas comprises an indicator representing that a predetermined function was accessed from within the thread represented by the thread area.

11. The display device of claim 10, wherein the software program under test is an application program running on an operating system and the predetermined function comprises a function within the application program.

12. The display device of claim 7, additionally comprising a time scale area adjacent the thread area, the time scale area correlated in time with the events in the plurality of threads represented by indicators.

13. The display device of claim 7, additionally comprising a text area, the text area comprising an ordered listing of events during the operation of at least one thread, the ordered listing of events comprising function entries.

14. A computer-readable medium having computer-executable components for analyzing the performance of a software program under test, the software program under test adapted to execute in a plurality of threads, the computer-executable components comprising:

(a) a data collection component, adapted to collect data on the execution of the plurality of threads in the software program under test;
(b) an analysis component, adapted to analyze the collected data to derive execution information about the plurality of threads; and
(c) a reporting component, adapted to:
 display in human perceptible form, the execution information of the plurality of threads, the human perceptible form including a graphical representation of execution information as a function of time for each the plurality of threads, with the graphical representations of each of the plurality of threads displayed in a format that allows correlation of time of events in each of the plurality of threads;
 display, separate from the execution information of the plurality of threads, a graphical representation of a cumulative activity level of execution of the software program under test, the graphical representation of the cumulative activity level corresponding to a time range;
 display an indicator for specifying along the graphical representation of the cumulative activity level an indicated portion of the time range for display of the plurality of threads, the indicated portion being strictly smaller than the time range;
 receive user input to move the indicator to a different portion of the time range;
 in response to the user input to move the indicator, modify the graphical representation of execution information to represent the execution information of the plurality of threads for the different portion of the time range;
 selectively display textual information regarding at least some of the plurality of threads; and
 allow a user to reversibly specify a nature of textual information to be displayed.

15. The computer-readable medium of claim 14, wherein the reporting component is adapted to display a graphical representation of at least one of the plurality of threads, the graphical representation comprising an indication of when at least one thread is blocked while waiting for a response from another thread in the plurality of threads.

16. The computer-readable medium of claim 15, wherein the software program under test is adapted to execute on a platform comprising an operating system that may perform a predetermined event and the reporting component is adapted to display a graphical representation of at least one of the plurality of threads including an indication of whether the thread triggered the operating system to perform the predetermined event.

17. The computer-readable medium of claim 15, wherein the software program under test comprises at least one API and the data collection component is adapted to collect data indicating that the API was accessed and the reporting component is adapted to display a graphical representation of at least one of the plurality of threads including an indication of whether the API was accessed from within the thread.

* * * * *